United States Patent
Marchlewski et al.

(10) Patent No.: US 10,787,131 B2
(45) Date of Patent: Sep. 29, 2020

(54) ROOF ACCESSORY INTERFACE

(71) Applicant: Ford Global Technologies, LLC, Dearborn, MI (US)

(72) Inventors: Jack Marchlewski, Saline, MI (US); Dragan B. Stojkovic, Taylor, MI (US); Joshua Robert Hemphill, White Lake, MI (US); Robert Reiners, Grosse Ile, MI (US); Jeffrey Gray, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 101 days.

(21) Appl. No.: 15/919,592

(22) Filed: Mar. 13, 2018

(65) Prior Publication Data
US 2019/0283682 A1    Sep. 19, 2019

(51) Int. Cl.
| | |
|---|---|
| *B60R 9/058* | (2006.01) |
| *B62D 25/06* | (2006.01) |
| *B60J 7/10* | (2006.01) |
| *B60R 9/04* | (2006.01) |
| *B60J 7/11* | (2006.01) |
| *B60J 7/047* | (2006.01) |
| *B62D 25/08* | (2006.01) |
| *F16B 21/04* | (2006.01) |

(52) U.S. Cl.
CPC ............... *B60R 9/058* (2013.01); *B60J 7/106* (2013.01); *B60J 7/11* (2013.01); *B60R 9/04* (2013.01); *B60J 7/047* (2013.01); *B62D 25/06* (2013.01); *B62D 25/087* (2013.01); *F16B 21/04* (2013.01)

(58) Field of Classification Search
CPC .. B60R 9/04; B60R 7/00; B60R 9/058; B62D 25/08; A44B 17/00; H01R 11/30; B60J 7/11; B60J 7/10; B60J 7/102
See application file for complete search history.

(56) References Cited

U.S. PATENT DOCUMENTS

| | | | | |
|---|---|---|---|---|
| 3,724,730 A | * | 4/1973 | Olsen | B60R 9/04 224/309 |
| 3,838,802 A | * | 10/1974 | Grycel, III | B60R 9/058 224/309 |
| 4,007,516 A | * | 2/1977 | Coules | F16B 21/04 411/349 |
| 4,063,774 A | * | 12/1977 | Hanks | B60J 7/041 296/216.04 |
| 4,095,841 A | * | 6/1978 | Thompson | B60J 7/106 296/215 |
| 4,132,335 A | * | 1/1979 | Ingram | B60R 9/045 224/324 |

(Continued)

FOREIGN PATENT DOCUMENTS

| | | |
|---|---|---|
| DE | 19959940 B4 | 9/2009 |
| KR | 100677672 B1 | 2/2007 |
| WO | 2016151076 A1 | 9/2016 |

*Primary Examiner* — Brian D Nash
(74) *Attorney, Agent, or Firm* — David Coppiellie; Carlson, Gaskey & Olds, P.C.

(57) ABSTRACT

A motor vehicle according to an exemplary aspect of this disclosure includes, among other things, a roof structure, a bracket projecting from the roof structure, a roof panel configured to attach to the roof structure such that the bracket is beneath the roof panel, and an accessory configured to attach to the bracket. A method is also disclosed.

12 Claims, 6 Drawing Sheets

(56) References Cited

U.S. PATENT DOCUMENTS

| | | | | |
|---|---|---|---|---|
| 4,167,284 A * | 9/1979 | Messina | B60P 3/34 | 224/309 |
| 4,245,764 A * | 1/1981 | Kowalski | B60R 9/045 | 224/321 |
| 4,269,339 A * | 5/1981 | Bott | B60R 9/04 | 224/309 |
| 4,272,121 A * | 6/1981 | Kim | B60J 7/041 | 224/309 |
| 4,274,570 A * | 6/1981 | Bott | B60R 9/045 | 224/324 |
| 4,283,086 A * | 8/1981 | Morin | B62D 27/04 | 296/178 |
| 4,533,171 A * | 8/1985 | Lake | B60P 3/34 | 296/173 |
| 4,626,024 A * | 12/1986 | Swann | B60J 5/125 | 296/216.03 |
| 4,626,026 A * | 12/1986 | Hasegawa | B60J 7/11 | 16/364 |
| 4,630,029 A * | 12/1986 | Hayward | B60Q 1/2611 | 296/218 |
| 4,647,262 A * | 3/1987 | Yokota | F16B 21/02 | 24/453 |
| 4,756,571 A * | 7/1988 | Lake | B60J 7/1621 | 296/100.1 |
| 4,848,112 A * | 7/1989 | Graber | F16B 41/005 | 70/231 |
| 4,932,717 A * | 6/1990 | Swann | B60J 7/041 | 224/309 |
| 5,306,156 A * | 4/1994 | Gibbs | B60Q 1/302 | 224/315 |
| 5,368,427 A * | 11/1994 | Pfaffinger | F16B 21/04 | 24/580.1 |
| 5,531,497 A * | 7/1996 | Cheng | B60J 7/061 | 296/100.01 |
| 5,725,273 A * | 3/1998 | Vernon | B60J 7/11 | 224/315 |
| 5,732,864 A * | 3/1998 | Stapleton | B60R 9/045 | 224/309 |
| 5,738,405 A * | 4/1998 | Richters | B60J 1/085 | 296/146.15 |
| 5,765,959 A * | 6/1998 | Shioda | E05B 79/12 | 403/192 |
| 5,803,529 A * | 9/1998 | Perry-Bores | B60J 7/10 | 296/107.09 |
| 5,954,192 A * | 9/1999 | Iitsuka | H01H 19/11 | 200/336 |
| 5,954,380 A * | 9/1999 | Ament | B60R 21/06 | 296/24.43 |
| 5,992,917 A * | 11/1999 | Hilliard | B60J 1/1815 | 296/103 |
| 6,033,012 A * | 3/2000 | Russke | B60J 1/1823 | 296/107.17 |
| 6,068,168 A * | 5/2000 | Kreisler | B60R 9/00 | 224/309 |
| 6,076,881 A * | 6/2000 | Tucker | B60J 7/141 | 296/100.07 |
| 6,203,100 B1 * | 3/2001 | Gordon | B60J 7/106 | 296/102 |
| 6,309,007 B1 * | 10/2001 | Essig | B60J 7/106 | 296/102 |
| 6,338,520 B2 * | 1/2002 | Rusu | B60J 7/1621 | 248/231.51 |
| 6,347,484 B1 * | 2/2002 | Swanger | B60J 7/1642 | 49/193 |
| 6,530,621 B1 * | 3/2003 | Williams | B60J 7/102 | 224/326 |
| 6,575,521 B2 * | 6/2003 | Tarahomi | B60J 7/106 | 296/103 |
| 6,588,824 B2 * | 7/2003 | Neubrand | B60J 7/061 | 296/105 |
| 6,612,795 B2 * | 9/2003 | Kirchen | F16B 21/02 | 24/297 |
| 6,712,418 B1 * | 3/2004 | Lathers | B60J 7/1614 | 296/100.02 |
| 6,769,853 B2 * | 8/2004 | Perrot | F16B 5/0628 | 296/191 |
| 6,997,497 B2 * | 2/2006 | Sagi | B60R 9/055 | 224/309 |
| 7,055,896 B2 * | 6/2006 | Ozkok | B60R 9/04 | 296/210 |
| 7,121,619 B2 * | 10/2006 | Henderson | B60J 7/0069 | 296/218 |
| 7,213,854 B2 * | 5/2007 | Dowdey | B60J 7/11 | 296/218 |
| 7,325,475 B2 * | 2/2008 | Long | B60P 1/6445 | 296/181.7 |
| 7,469,954 B2 * | 12/2008 | Fallis, III | B60J 7/10 | 296/105 |
| 7,549,199 B2 * | 6/2009 | Bugner | F16B 5/0628 | 24/289 |
| 7,699,372 B2 * | 4/2010 | Adams | B60R 9/055 | 224/324 |
| 7,802,842 B2 * | 9/2010 | Vogt | B62D 25/06 | 224/309 |
| 7,828,364 B2 * | 11/2010 | Causey | B60J 7/102 | 296/136.12 |
| 7,845,711 B2 * | 12/2010 | Orrell | B60J 1/04 | 296/146.16 |
| 7,900,991 B2 * | 3/2011 | Fallis, III | B60J 7/11 | 296/107.01 |
| 7,926,686 B2 * | 4/2011 | Salvador | B60R 9/045 | 224/321 |
| 8,146,480 B2 * | 4/2012 | Schneider | F41H 5/20 | 89/36.08 |
| 8,348,111 B2 | 1/2013 | Heuchert et al. | | |
| 8,408,623 B1 * | 4/2013 | McAuliff | B60J 7/11 | 296/210 |
| 8,622,457 B1 * | 1/2014 | McIntire | B60J 7/106 | 280/756 |
| 8,899,652 B2 * | 12/2014 | Brill | F41H 7/042 | 296/187.07 |
| 8,944,486 B2 * | 2/2015 | Donohoe | B62D 33/04 | 296/102 |
| 8,991,896 B1 * | 3/2015 | Whitehead | B60J 7/106 | 296/121 |
| 9,114,690 B1 * | 8/2015 | Bowles | B60R 21/13 | |
| 9,187,045 B2 * | 11/2015 | Bittner | B60R 9/04 | |
| 9,216,632 B2 * | 12/2015 | Lewis | B60J 7/061 | |
| 9,267,525 B2 | 2/2016 | Everard | | |
| 9,376,002 B2 * | 6/2016 | Bennett | B60J 7/061 | |
| 9,718,410 B2 | 8/2017 | Cropley et al. | | |
| 9,931,920 B1 * | 4/2018 | Stojkovic | B60J 7/194 | |
| 10,035,408 B2 * | 7/2018 | Crismon | B60J 7/106 | |
| 10,040,485 B1 * | 8/2018 | Stojkovic | B62D 25/07 | |
| 10,173,507 B2 * | 1/2019 | Rodriguez | B60J 1/1838 | |
| 2001/0038225 A1 * | 11/2001 | Muirhead | B60J 7/1621 | 296/100.06 |
| 2003/0141735 A1 * | 7/2003 | Albaisa | B60R 9/04 | 296/37.7 |
| 2004/0146373 A1 * | 7/2004 | Kiester | B60P 3/40 | 410/129 |
| 2005/0116511 A1 * | 6/2005 | Leroy | B60J 7/02 | 296/216.01 |
| 2005/0276677 A1 * | 12/2005 | Andersson | B60R 9/04 | 411/551 |
| 2009/0045652 A1 * | 2/2009 | Mossberg | B60R 21/06 | 296/193.08 |
| 2009/0321485 A1 * | 12/2009 | Jamieson | B60R 9/04 | 224/309 |
| 2010/0026027 A1 * | 2/2010 | Gao | B62D 33/0273 | 296/26.11 |
| 2011/0266822 A1 * | 11/2011 | Takemura | B60R 21/06 | 296/24.43 |
| 2013/0015218 A1 * | 1/2013 | Surkin | B60R 9/048 | 224/309 |
| 2014/0097637 A1 * | 4/2014 | Kargilis | B60J 1/1884 | 296/146.16 |

(56) References Cited

U.S. PATENT DOCUMENTS

| | | | |
|---|---|---|---|
| 2016/0059787 A1* | 3/2016 | Stakoe | B60R 5/044 |
| | | | 296/24.43 |
| 2016/0090048 A1* | 3/2016 | Crandall | B60R 9/06 |
| | | | 224/403 |
| 2016/0362055 A1 | 12/2016 | McFadden et al. | |

* cited by examiner

ROOF ACCESSORY INTERFACE

TECHNICAL FIELD

This disclosure relates to a roof accessory interface for a motor vehicle and a corresponding method.

BACKGROUND

Some motor vehicles, such as sport utility vehicles (SUVs), are known to include interchangeable soft-top and hard-top roofs. Depending on a user preference, the user may attach either a soft-top roof or a hard-top roof to the roof structure of the vehicle. Alternatively, the user may choose to use the vehicle without either a soft-top or a hard-top roof attached to the roof structure. The roof structure, in some examples, is provided by the roll bars of the vehicle.

Soft-top roofs include a fabric covering at least a portion of the passenger cabin. Typically, the fabric is made of canvas or leather, and is configured to protect the occupants of the passenger cabin from exposure to the elements, namely rain and sun. On the other hand, hard-top roofs typically include a plurality of panels made of rigid material, such as metal, plastic, and/or glass.

SUMMARY

A motor vehicle according to an exemplary aspect of this disclosure includes, among other things, a roof structure, a bracket projecting from the roof structure, a roof panel configured to attach to the roof structure such that the bracket is beneath the roof panel, and an accessory configured to attach to the bracket.

In a further non-limiting embodiment of the foregoing motor vehicle, the roof panel includes an opening, and a portion of the accessory projects through the opening to attach to the bracket.

In a further non-limiting embodiment of any of the foregoing motor vehicles, the motor vehicle includes a cap configured to cover the opening in the roof panel when the accessory is not attached to the bracket.

In a further non-limiting embodiment of any of the foregoing motor vehicles, the accessory is configured to attach to the bracket by way of a quarter-turn fastener.

In a further non-limiting embodiment of any of the foregoing motor vehicles, the bracket includes a slot, and the accessory includes a rotatable tab configured to allow movement of the accessory relative to the bracket in a first position and configured to prevent movement of the accessory relative to the bracket in a second position.

In a further non-limiting embodiment of any of the foregoing motor vehicles, the rotatable tab is configured to rotate about ninety-degrees between the first and second positions.

In a further non-limiting embodiment of any of the foregoing motor vehicles, the accessory includes one of a lug and a handle coupled to the rotatable tab.

In a further non-limiting embodiment of any of the foregoing motor vehicles, the motor vehicle includes a lock configured to lock the rotatable tab in the second position.

In a further non-limiting embodiment of any of the foregoing motor vehicles, the lock is a push-lock.

In a further non-limiting embodiment of any of the foregoing motor vehicles, the lock is configured to couple to a stud projecting from the bracket.

In a further non-limiting embodiment of any of the foregoing motor vehicles, the accessory is a component of a roof rack.

In a further non-limiting embodiment of any of the foregoing motor vehicles, the roof structure is a roll bar.

In a further non-limiting embodiment of any of the foregoing motor vehicles, the bracket is welded to the roof structure.

A method according to an exemplary aspect of the present disclosure includes, among other things, attaching an accessory to a bracket projecting from a roof structure.

In a further non-limiting embodiment of the foregoing method, the attaching step includes rotating a tab of the accessory relative to a slot of the bracket to prevent relative movement between the accessory and the bracket.

In a further non-limiting embodiment of any of the foregoing methods, the rotating step includes rotating the tab about ninety-degrees.

In a further non-limiting embodiment of any of the foregoing methods, the method includes locking the tab in place after rotating the tab.

In a further non-limiting embodiment of any of the foregoing methods, the method includes detaching the accessory from the bracket. Further, the detaching step includes rotating the tab about ninety-degrees.

In a further non-limiting embodiment of any of the foregoing methods, the roof structure is a roll bar.

In a further non-limiting embodiment of any of the foregoing methods, the accessory is a component of a roof rack.

BRIEF DESCRIPTION OF THE DRAWINGS

FIGS. 7A-7C illustrate a first example sequence for securing the roof accessory relative to the vehicle. In particular:

FIGS. 8A-8E illustrate a second example sequence for securing the roof accessory relative to the vehicle. In particular:

FIG. 9A is a perspective view of an example roof accessory including a handle. In FIG. 9A, the handle projects outward of the roof accessory.

FIG. 9B is a side view of the handle of FIG. 9A. In FIG. 9B, the handle is within the roof accessory.

DETAILED DESCRIPTION

This disclosure relates to a roof accessory interface for a motor vehicle and a corresponding method. An example motor vehicle includes a roof structure, which may be provided by a roll bar, and a bracket projecting from the roof structure. A roof panel, such as a hard-top roof panel, is configured to attach to the roof structure such that the bracket is beneath the roof panel. Further, an accessory, such as a component of a roof rack, is configured to attach to the bracket.

In this way, the accessory is mountable to the vehicle whether or not the roof panel is present. Thus, the accessory can be used with or without a hard-top roof. Further, when the roof panel is present, the accessory is substantially flush with the roof panel, which gives the vehicle a more aerodynamic shape and increases the overall vehicle aesthetic. The accessory can also be attached to the bracket using a lockable quarter-turn fastener, which allows the accessory to be quickly attached and detached from the vehicle without compromising safety. These and other benefits will be appreciated from the below discussion.

Figure 1A:
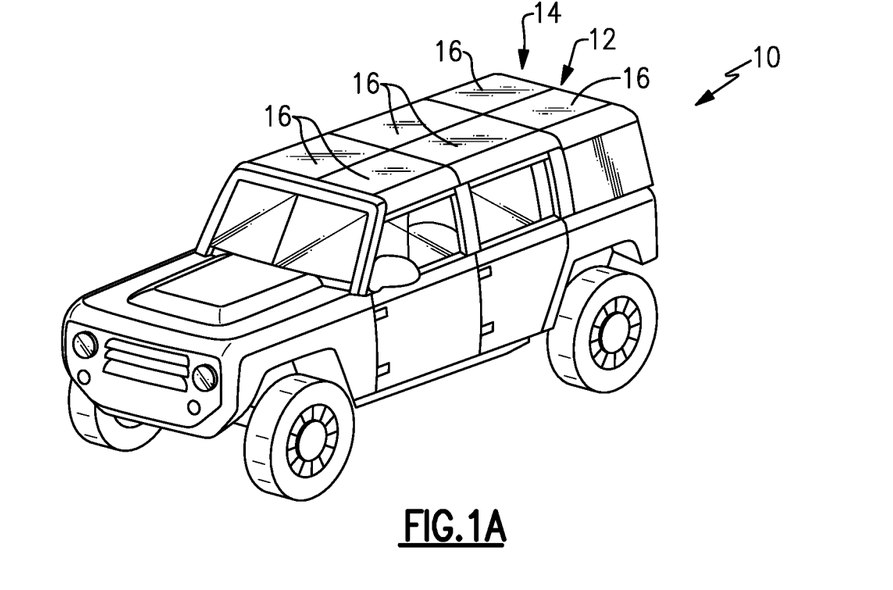
FIG. 1A is a perspective view of an example motor vehicle with a hard-top roof.

Referring to the drawings, FIG. 1A is a perspective view of an example motor vehicle 10. The vehicle 10 is a sport utility vehicle (SUV) and has a roof 12. The roof 12, in this example, includes a removable hard-top 14 (sometimes called a "hard-top roof"). The removable hard-top 14 is provided by a plurality of roof panels 16. The roof panels 16 may be made of a rigid material, such as one or more of plastic, metal, and/or glass. Together, the roof panels 16 protect the vehicle cabin and its occupants from the outside environment. Removing the roof panels 16 exposes the vehicle cabin and its occupants to the outside environment. During periods of good weather, removing the roof panels 16 can lead to increased enjoyment and an enhanced riding experience for the occupants of the vehicle.

While a hard-top 14 is shown in the figures, it should be understood that this disclosure extends to vehicles with a soft-top roof. Further, in this example, there are six roof panels 16. This disclosure extends to vehicles having a different number of roof panels. Additionally, it should be understood that this disclosure extends to other types of vehicles and is not limited to SUVs.

Figure 1B:
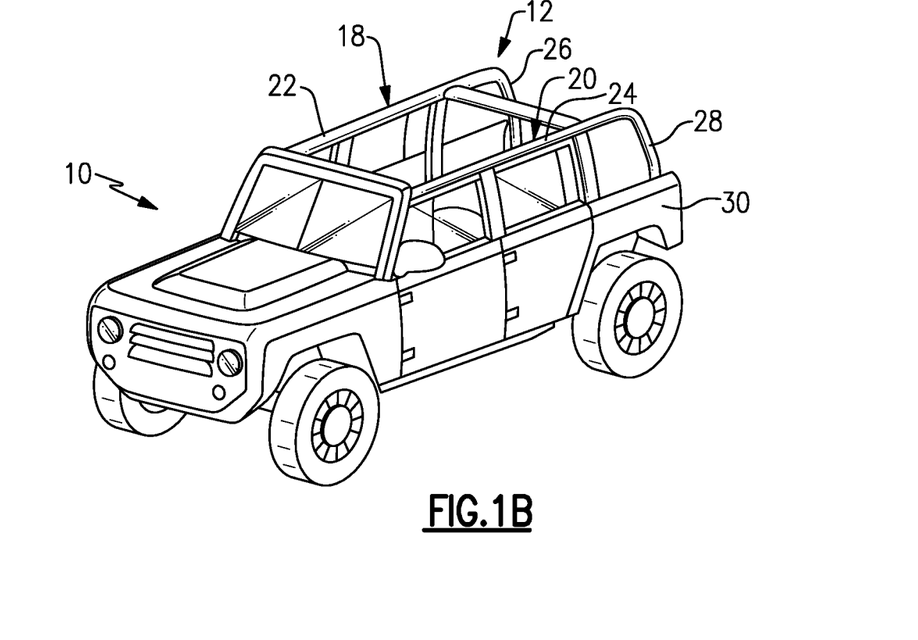
FIG. 1B is a perspective view of the example vehicle of FIG. 1A with the hard-top roof removed.

The roof panels 16 are configured to attach to a roof structure of the vehicle 10. With reference to FIG. 1B, in which the roof panels 16 are removed from the vehicle 10, the vehicle 10 includes first and second roof structures 18, 20 in this example. The first and second roof structures 18, 20 are roll bars. Each of the first and second roof structures 18, 20 includes a horizontal portion 22, 24 extending along opposite sides of the vehicle 10, and vertical portions 26, 28 extending between the horizontal portions 22, 24 and a vehicle body 30. While a particular roof structure is shown in the figures, this disclosure extends to other roof arrangements, including roof structures that are not provided by roll bars, and including roof structures that include cross-bars extending between the horizontal portions 22, 24.

Figures 2, 3, 4:
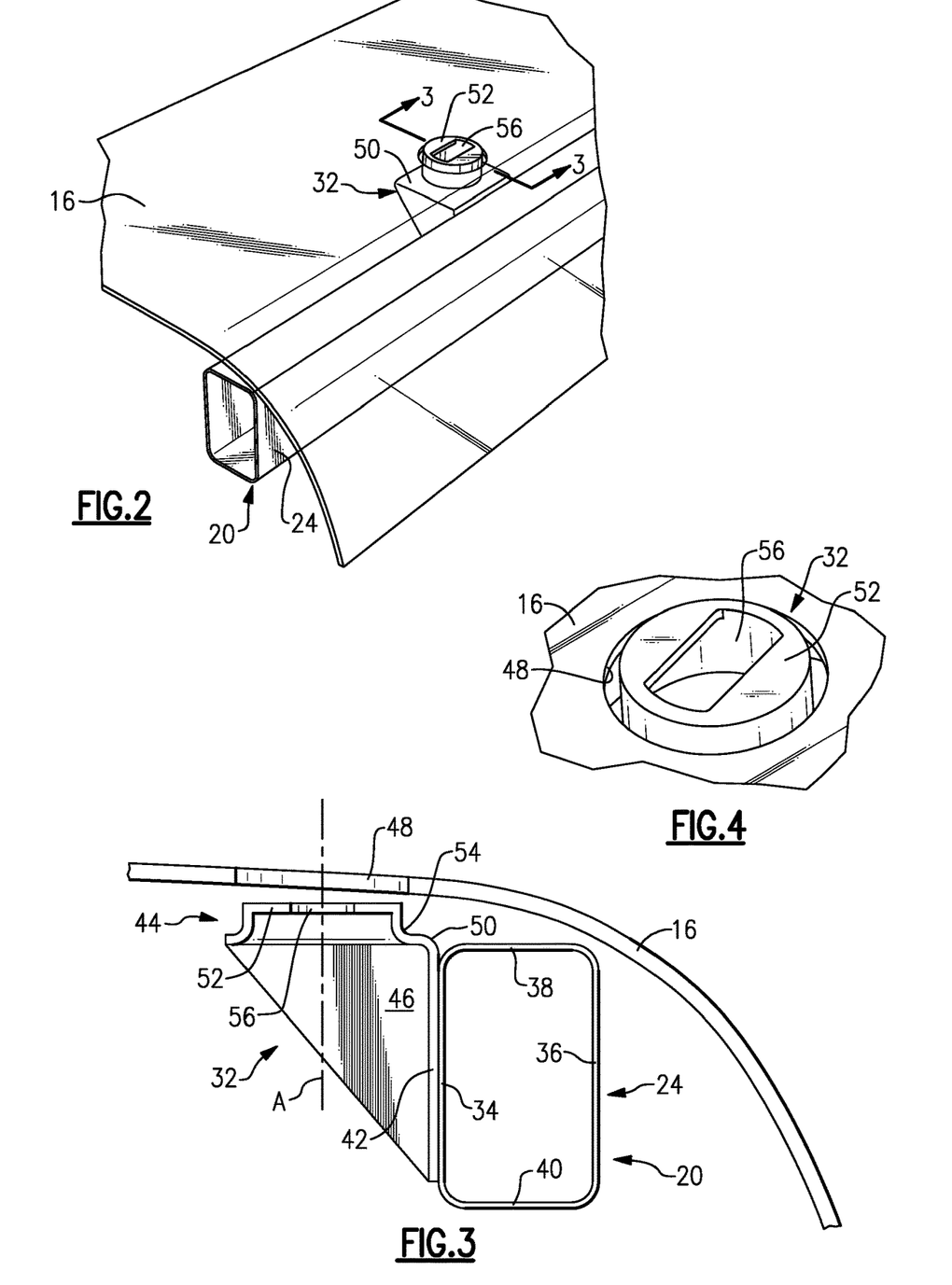
FIG. 2 is a close-up view of the vehicle, and in particular illustrates an example arrangement between a roof panel, a roof structure, and a bracket.
FIG. 3 is a cross-sectional view taken along line 3-3 in FIG. 2.
FIG. 4 is a close-up view of the roof panel and bracket of FIG. 2.

In this disclosure, a roof accessory, such as a component of a roof rack, is attachable to the roof structures 18, 20 by way of brackets projecting from the roof structures. One such bracket 32 is illustrated in FIG. 2. FIG. 2 is a close-up view of the roof structure 20, one of the roof panels 16, and an example bracket 32 from a top perspective. In FIG. 2, the roof panel 16 is transparent for purposes of illustrating the bracket 32. The panel 16 may be at least partially opaque in other examples.

In this example, the roof panel 16 is configured to attach to the roof structure 20 such that the bracket 32 is beneath the roof panel 16. In particular, the entirety of the bracket 32 is beneath the roof panel 16, and the bracket 32 does not project outward beyond the roof panel 16. The detail of an example arrangement between the roof panel 16, roof structure 20, and the bracket 32 will now be described relative to FIG. 3.

With reference to FIG. 3, the roof structure 20 is substantially rectangular in cross-sectional shape in this example. The example roof structure 20 includes an interior surface 34 facing an interior of the vehicle 10, an exterior surface 36 generally opposite the interior surface 34, and top and bottom surfaces 38, 40. The roof panel 16 may be affixed to one or both of the exterior and top surfaces 36, 38.

The bracket 32, in this example, is attached to the interior surface 34 of the roof structure 20 such that it projects inward of the roof structure 20. In one example, the bracket 32 is welded to the interior surface 34. The bracket 32 may be attached to the roof structure 20 using other techniques, however.

The bracket 32 includes an outer surface 42, which is substantially parallel to the interior surface 34. The bracket 32 further includes an upper section 44 projecting inward from an upper edge of the outer surface 42. The bracket 32 further includes side walls 46 projecting from front and rear ends of the outer surface 42 to reinforce the upper section 44.

The upper section 44 is configured to interface with a roof accessory. The roof accessory, in this example, is configured to cooperate with the upper section 44 via an opening 48 in the roof panel 16. The opening 48 and upper section 44 are disposed along and concentric with an axis A.

The upper section 44 of the bracket 32 includes a first section 50, and a second section 52 spaced-apart from, and above, the first section 50 by way of a flange 54. When viewed from a top perspective, such as in FIG. 2, the first section 50 is substantially rectangular in shape, while the second section 52 is substantially circular in shape. This disclosure is not limited to the illustrated shapes of the first and second sections 50, 52, however.

The second section 52 includes a slot 56 therein. The slot 56, in this example, is substantially rectangular in shape when viewed from a top perspective, as perhaps best seen in FIGS. 2 and 4. The slot 56 is configured to cooperate with a tab of a roof accessory in order to attach the roof accessory to the bracket 32, as will now be described below.

Figure 5:
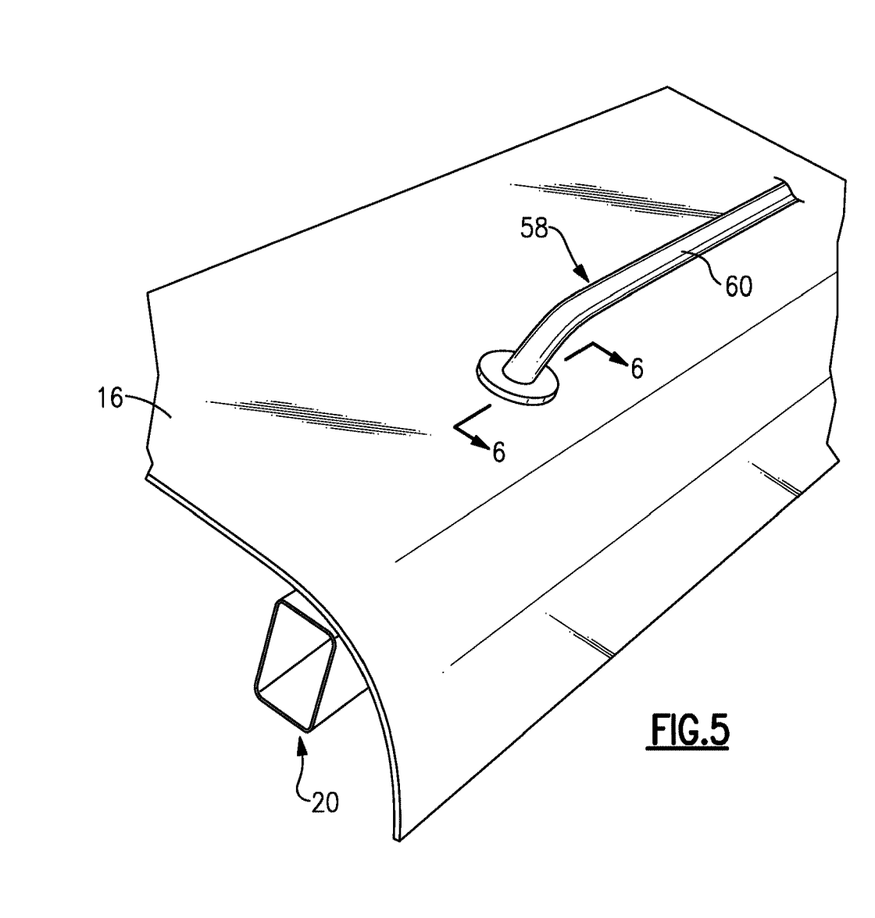
FIG. 5 illustrates a roof accessory attached to the vehicle.

FIG. 5 is a view similar to FIG. 2, except FIG. 5 shows an example roof accessory 58 attached to vehicle 10, and in particular attached to the bracket 32. In this example, the roof accessory 58 is a component of a roof rack. In particular, the roof accessory 58 is a roof rail configured to extend along a side of the vehicle 10. While FIG. 5 shows one portion of the roof accessory 58, it should be understood that an opposite end of the roof accessory 58 is configured substantially as shown in FIG. 5, and in particular is configured to attach to a bracket similar to the bracket 32. While the roof accessory 58 spans along the sides of the vehicle 10 in FIG. 5, the roof accessory 58 may span between the sides of the vehicle 10. The roof accessory 58 may connect directly or indirectly to cargo, equipment, or another sort of rack such as a bike rack, luggage rack, etc.

Figure 6:
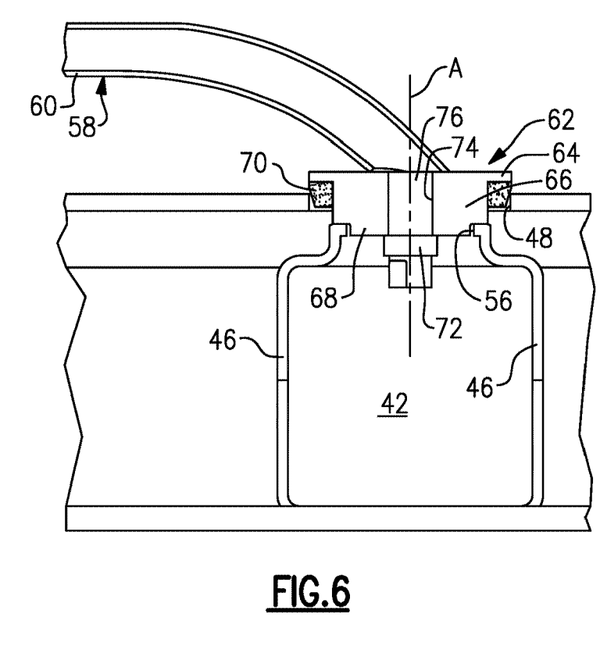
FIG. 6 is a cross-sectional view taken along line 6-6 in FIG. 5.

With reference to FIGS. 5 and 6, the roof accessory 58 includes a main body portion 60 extending substantially parallel to the roof panel 16 over a majority of the length of the roof accessory 58. As the roof accessory 58 approaches the bracket 32, the main body portion 60 curves toward the roof panel 16 and terminates at a plug 62. The plug 62 is sized and shaped for receipt in the opening 48 of the roof panel 16. In particular, a portion of the plug 62 projects through the opening 48 when the roof panel 16 is present. Further, as generally noted above, the plug 62 (and the roof accessory 58, in general) is configured to cooperate with the bracket 32 even when the roof panel 16 is removed from the vehicle, thereby allowing the user to mount cargo or equipment to the vehicle 10 even when the roof panel 16 is removed.

The plug 62, in this example, is concentric with the axis A. The example plug 62 includes an outer flange 64, a main body 66, and a projection 68. The main body 66 is substantially cylindrical, and the outer flange 64 projects radially outward of the main body 66, relative to the axis A. The projection 68 projects downward from the main body 66 and is sized and shaped to correspond to the slot 56 in the upper section 44 of the bracket 32. Engagement between the slot 56 and the projection 68 provides stability to roof accessory 58. Further, in this example, a gasket 70 is positioned about the main body 66 adjacent the flange 64 to prevent leakage of water and/or air leakage through the opening 48. The contact between the main body 66 and the opening 48, via the gasket 70, also provides additional stability to the roof accessory 58 when the roof panel 16 is present.

In one example of this disclosure, the roof accessory 58 is connected to the bracket 32 by way of a manually actuated fastener. In one particular example, the fastener is a quarter-turn fastener. Quarter-turn fasteners allow a user to toggle between an unlocked and a locked position by a mere quarter-turn, meaning about a ninety-degree (90°) rotation.

In one example of this disclosure, a quarter-turn fastener is provided by the slot 56 in the bracket 32 and a rotatable tab 72. In the illustrated example, the plug 62 supports the rotatable tab 72. Specifically, the plug 62 includes a cylindrical bore 74 supporting a shaft 76 of the rotatable tab 72 such that the rotatable tab 72 is rotatable relative to the plug 62 about the axis A. The rotatable tab 72 is sized and shaped to substantially correspond to the size and shape of the slot 56, with the rotatable tab 72 being slightly smaller than the slot 56 to allow the rotatable tab 72 to be inserted into and removed from the slot 56.

Example methods of use of this disclosure will now be described relative to FIGS. 7A-7C and 8A-8E. Two example types of locks will also be described.

In general, in both sets of figures, the rotatable tab 72 is rotatable between a first position and a second position. The second position is about ninety-degrees (90°) from the first position. In the first position, the rotatable tab 72 is configured to allow movement of the roof accessory 58 relative to the bracket 32. In the second position, however, the rotatable tab 72 prevents movement of the roof accessory 58 relative to the bracket 32. In this way, the second position may be considered a secured position.

Figure 7A:
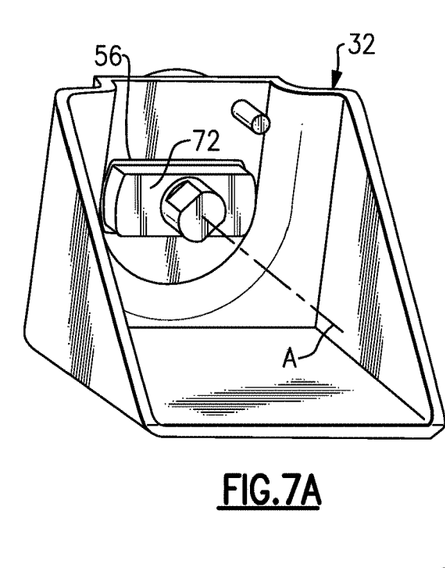
FIG. 7A illustrates a rotatable tab is in a first position relative to a bracket.

FIG. 7A illustrates the rotatable tab 72 in the first position. The rotatable tab 72 may be in the first position when a user desires to attach or detach the roof accessory 58 from the bracket 32. In the first position, the plug 62 and rotatable tab 72 are moveable along the axis A. In FIG. 7A, the roof accessory 58 is arranged relative to the bracket 32 such that the rotatable tab 72 has passed through the slot 56.

Figure 7B:
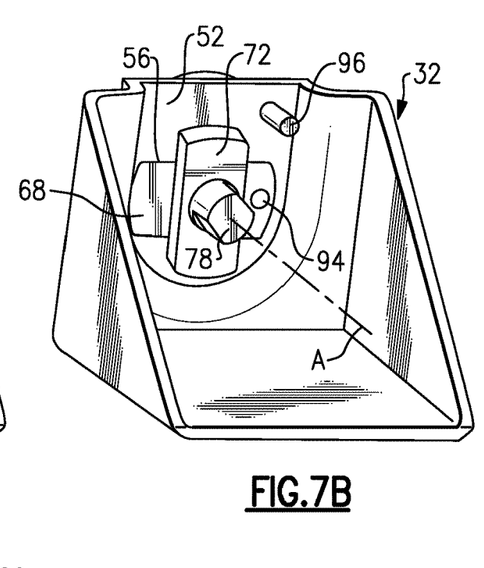
FIG. 7B illustrates the rotatable tab in a second position relative to the bracket.

FIG. 7B illustrates the rotatable tab 72 in the second position. In the second position, the rotatable tab 72 has rotated about ninety-degrees (90°) relative to the first position. In this way, the rotatable tab 72 is no longer aligned with the slot 56, and instead is brought into contact with the underside of the second section 52 of the bracket 32.

Figure 7C:
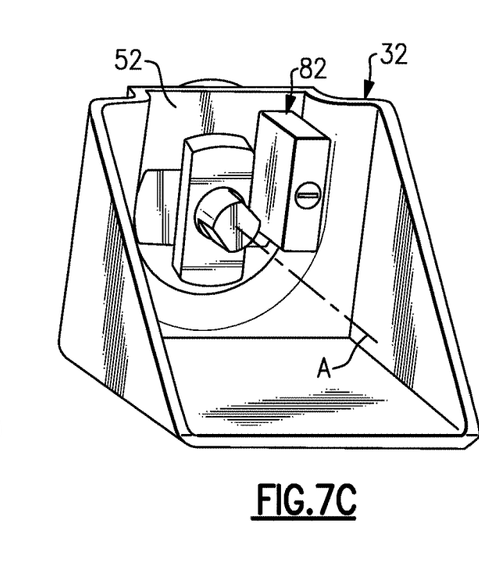
FIG. 7C illustrates a first example lock configured to lock the rotatable tab in the second position.

In this example, the rotatable tab 72 is rotated from the first position to the second position by a lug 78. The lug 78 projects downward from a lower surface of the rotatable tab 72, and is configured to engage a tool. A user manually rotates the lug 78, and in turn the rotatable tab 72, using the tool. The user may conveniently access the lug 78 from a cabin of the vehicle. While a lug 78 is shown in FIGS. 7A-7C, the rotatable tab 72 may be rotated in other ways, one of which will be described below.

Figure 7D:
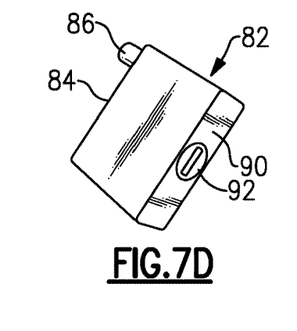
FIG. 7D is a bottom-perspective view of the first example lock.
Figure 7E:
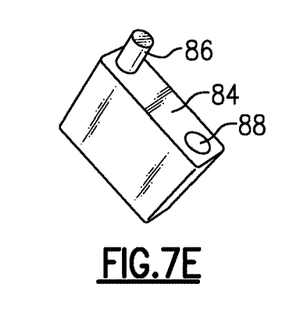
FIG. 7E is a top-perspective view of the first example lock.

When the rotatable tab 72 is in the second position of FIG. 7B, it may be desirable to lock the rotatable tab 72 in place to prevent theft of the roof accessory 58 and to increase safety overall. One example lock 82 is illustrated in FIG. 7C. The lock 82 is a pin lock in this example. The detail of the lock 82 is illustrated in FIGS. 7D and 7E. The lock 82 includes a first end 84 having a stud 86 projecting therefrom and an orifice 88 formed therein. The lock 82 further includes a second end 90 opposite the first end 84. The second end 90 includes a key hole 92 configured to cooperate with a key.

When the rotatable tab 72 is in the second position, a clearance hole 94 in the projection 68 of the plug 62 is exposed. The clearance hole 94 is configured to receive the stud 86 of the lock 82. The orifice 88 of the lock 82, on the other hand, is configured to engage a stud 96 projecting from an underside of the second section 52 of the bracket 32. A user may selectively engage the lock 82 to the bracket 32 by aligning the stud 86 with the clearance hole 94 and the orifice 88 with the stud 96 while pressing in the axial direction until the lock 82 is held in place. The user may selectively disengage the lock using a key, and, in particular, inserting the key into the key hole 92. When the lock 82 is engaged, the body of the lock 82 prevents rotation of the rotatable tab 72 from the second position to the first position.

Another example lock is shown in FIGS. 8A-8E. In FIGS. 8A-8E, the rotatable tab 72 includes a push-lock 98. The push-lock 98 is mounted to the rotatable tab 72 such that it is off-center, and not aligned with the axis A. The push-lock 98 includes a substantially cylindrical plunger 100, which can be depressed in a direction parallel to the axis A to perform a similar locking function to the lock 82 described above.

Figure 8A:
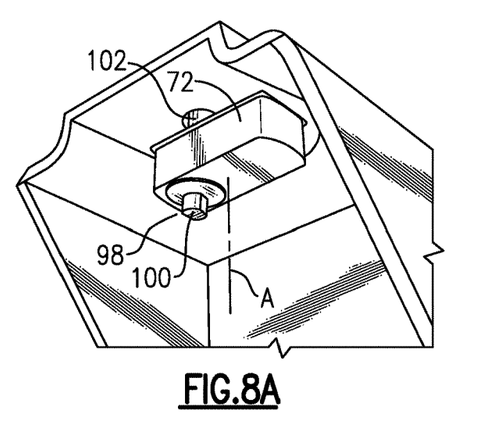
FIG. 8A illustrates a rotatable tab in a first position relative to a bracket. The rotatable tab is fitted with a second example lock in this example.
Figure 8B:
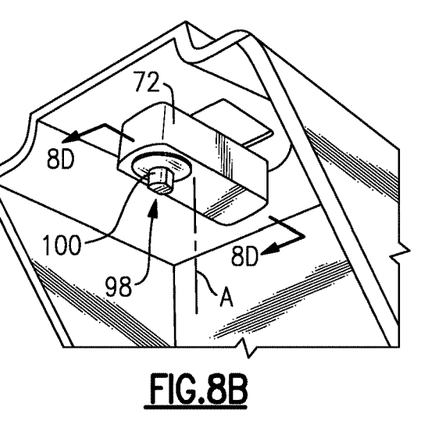
FIG. 8B illustrates the rotatable tab in a second position relative to the bracket.
Figure 8C:
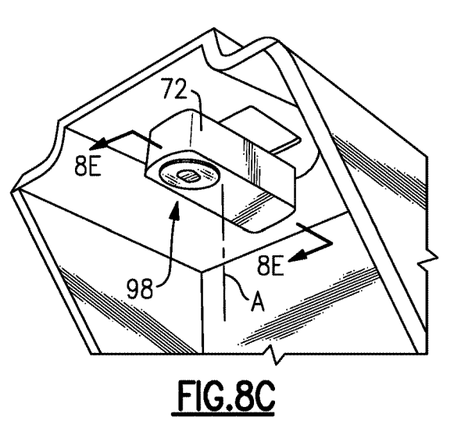
FIG. 8C illustrates the second example lock in a locked position.
Figure 8D:
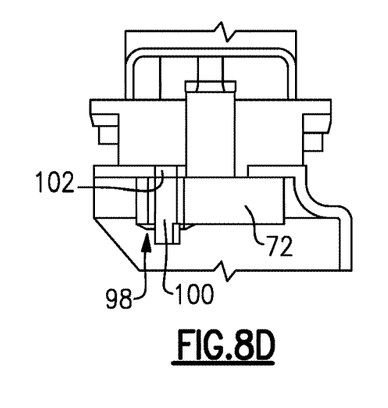
FIG. 8D is a cross-sectional view taken along line 8D-8D in FIG. 8B.
Figure 8E:
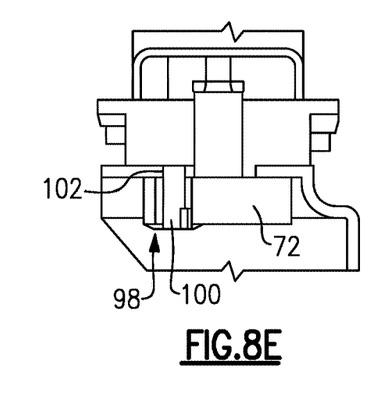
FIG. 8E is a cross-sectional view taken along line 8E-8E in FIG. 8C.

In FIG. 8A, the rotatable tab 72 is in the first position, and plunger 100 is not depressed. Thus, the rotatable tab 72 is permitted to rotate about the axis A to the second position. In the second position of FIG. 8B, the plunger 100 is aligned with a slot 102 formed in the upper section 52 of the bracket 32. The slot 102 is bound on one edge by the projection 68 of the plug 62, in this example. The alignment between the plunger 100 and the slot 102 is perhaps best seen in FIG. 8D. When aligned, the plunger 100 can be manually depressed by a user (e.g., using the user's thumb) such that an end of the plunger 100 enters the slot 102, as shown in FIGS. 8C and 8E. When the plunger 100 enters the slot 102, the rotatable tab 72 is prevented from rotating. A user may release the plunger 100 from the slot 102 using a key. In one example, the key is substantially cylindrical and fits around the outside of the plunger 100.

Figures 9A, 9B:
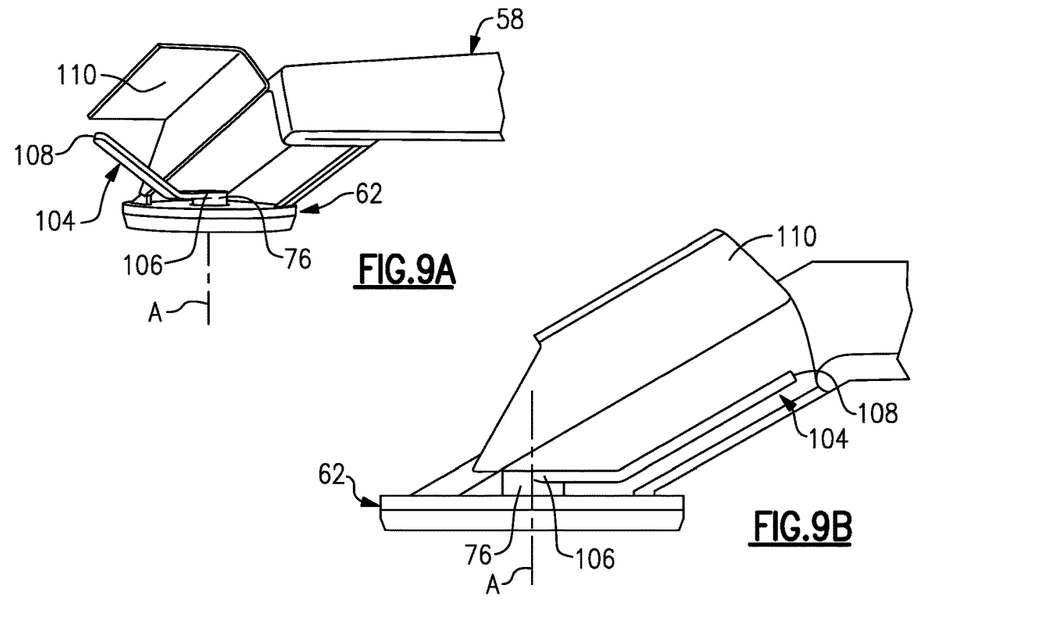

In the embodiment of FIGS. 8A-8E, the rotatable tab 72 does not include the lug 78, although it may. Instead of the lug 78, the rotatable tab 72 is rotated by a handle incorporated into the roof accessory 58. FIGS. 9A and 9B illustrate an example handle 104.

In this example, the handle 104 is positioned within the roof accessory 58 near the plug 62. The handle 104 includes one end 106 affixed to the shaft 76 of the rotatable tab 72, and a free end 108 opposite the end 106. The handle 104 can be grasped by a user and manually rotated to rotate the rotatable tab 72 about the axis A between the first and second positions.

The handle 104 is accessed by opening a flap 110 in the roof accessory 58. The flap 110, in this example, is rotatable relative to the remainder of the roof accessory 58. The flap 110 could be slidable in other examples. Further, this disclosure is not limited to a flap, and extends to other covers for the handle 104.

In this disclosure, the handle 104 projects outward of the roof accessory 58 when the rotatable tab 72 is in the first position, as shown in FIG. 9A. In this position, the user can readily grasp and rotate the handle 104. When the rotatable tab 72 is in the second position, the handle 104 is entirely within the roof accessory 58, as shown in FIG. 9B, and the flap 110 can be closed.

It should be understood that certain aspects of the disclosed embodiments are interchangeable. For example, the lug 78 could be used in place of the handle 104 in the embodiment of FIGS. 8A-8E, and the handle 104 may be used in place of the lug 78 in the embodiment of FIGS. 7A-7C. Further, the pin lock 82 of FIGS. 7A-7C could be used in connection with the handle 104, and the push-lock 98 could be used with the lug 78.

Figure 10:
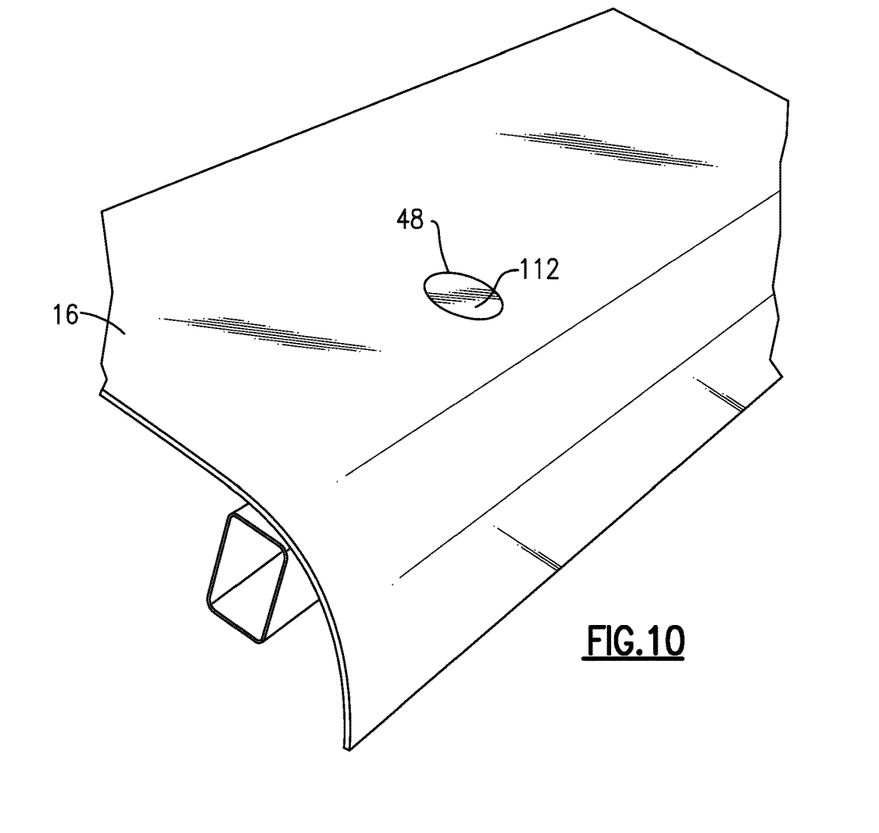
FIG. 10 illustrates an example cap covering an opening in a roof panel.

This disclosure allows one to attach a roof accessory to a vehicle 10 with or without panels. Further, when the roof panels are present, this disclosure provides a low profile attachment, which increases the aesthetic appeal of the vehicle 10. This disclosure further contemplates situations where a roof accessory is not desired at all, such as in situations where the user does not need to haul any extra cargo and/or when the user desires an even lower profile aesthetic. In such situations, the openings 48 in the roof panels 16 can be covered by a cap 112 (FIG. 10), which is sized and shaped to cover the opening 48 when a roof accessory 58 is not in use. The cap 112 may include ribs and flanges, as needed, to provide an appropriate attachment to the opening 48.

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component or arrangement.

It should be understood that terms such as "about," "substantially," and "generally" are not intended to be boundaryless terms, and should be interpreted consistent with the way one skilled in the art would interpret those terms. Further, directional terms such as "above," "below," "underside," "upward," "downward," "forward," "rearward," "inside," "outside," "interior," "exterior," "vertical," "top," and "bottom," etc., are used with reference to an normal operational attitude of a motor vehicle, and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a roof structure;
a bracket projecting from the roof structure;
a roof panel configured to attach to the roof structure such that the bracket is beneath the roof panel; and
an accessory configured to attach to the bracket, wherein the accessory is a component of a roof rack.

2. The motor vehicle as recited in claim 1, wherein:
the roof panel includes an opening, and
a portion of the accessory projects through the opening to attach to the bracket.

3. The motor vehicle as recited in claim 2, further comprising:
a cap configured to cover the opening in the roof panel when the accessory is not attached to the bracket.

4. The motor vehicle as recited in claim 1, wherein the bracket is attached to an interior surface of the roof structure such that the bracket projects inward from the roof structure toward a centerline of the motor vehicle.

5. The motor vehicle as recited in claim 1, wherein the roof panel is a portion of a removable hard top roof.

6. A motor vehicle, comprising:
a roof structure;
a bracket projecting from the roof structure;
a roof panel configured to attach to the roof structure such that the bracket is beneath the roof panel; and
an accessory configured to attach to the bracket,
wherein the accessory is configured to attach to the bracket by way of a quarter-turn fastener.

7. The motor vehicle as recited in claim 6, wherein:
the bracket includes a slot,
the accessory includes a rotatable tab configured to allow movement of the accessory relative to the bracket in a first position and configured to prevent movement of the accessory relative to the bracket in a second position.

8. The motor vehicle as recited in claim 7, wherein the rotatable tab is configured to rotate about ninety-degrees between the first and second positions.

9. The motor vehicle as recited in claim 8, wherein:
the accessory includes one of a lug and a handle coupled to the rotatable tab.

10. The motor vehicle as recited in claim 7, further comprising a lock configured to lock the rotatable tab in the second position.

11. The motor vehicle as recited in claim 10, wherein the lock is a push-lock.

12. The motor vehicle as recited in claim 10, wherein the lock is configured to couple to a stud projecting from the bracket.

\* \* \* \* \*